United States Patent [19]
Kim

[11] Patent Number: 5,831,400
[45] Date of Patent: Nov. 3, 1998

[54] DELAY-COMPENSATING DYNAMIC FOCUS AMPLIFIER

[75] Inventor: Hyun-Suk Kim, Suwon, Rep. of Korea

[73] Assignee: SamSung Electronics Co., Ltd., Suwon, Rep. of Korea

[21] Appl. No.: 805,332

[22] Filed: Feb. 24, 1997

[30] Foreign Application Priority Data

Feb. 24, 1996 [KR] Rep. of Korea ......................... 96-4537
Jan. 3, 1997 [KR] Rep. of Korea ............................. 97-26

[51] Int. Cl.$^6$ ..................................................... H01J 29/58
[52] U.S. Cl. ........................ 315/382.1; 348/326; 348/806
[58] Field of Search .................. 315/382, 382.1; 348/326, 806

[56] References Cited

U.S. PATENT DOCUMENTS 4,683,405  7/1987  Truskalo et al. ......................... 315/371

*Primary Examiner*—Theodore M. Blum
*Attorney, Agent, or Firm*—Robert E. Bushnell, Esq.

[57] ABSTRACT

A delay-compensating dynamic focus amplifier includes a delay compensation circuit including two one-shot multivibrators for receiving a horizontal flyback signal and generating a sawtooth wave to compensate for a delay by adjusting a duty cycle, a focus waveform generator for receiving a delay-compensation output signal from the delay-compensation circuit and for generating a horizontal parabolic waveform, an amplifier for receiving the horizontal parabolic waveform from the focus waveform generator and for amplifying it depending on a regulated gain so as to provide a predetermined output current, and a controller for providing a control signal to the delay-compensation circuit and the waveform generator.

2 Claims, 7 Drawing Sheets

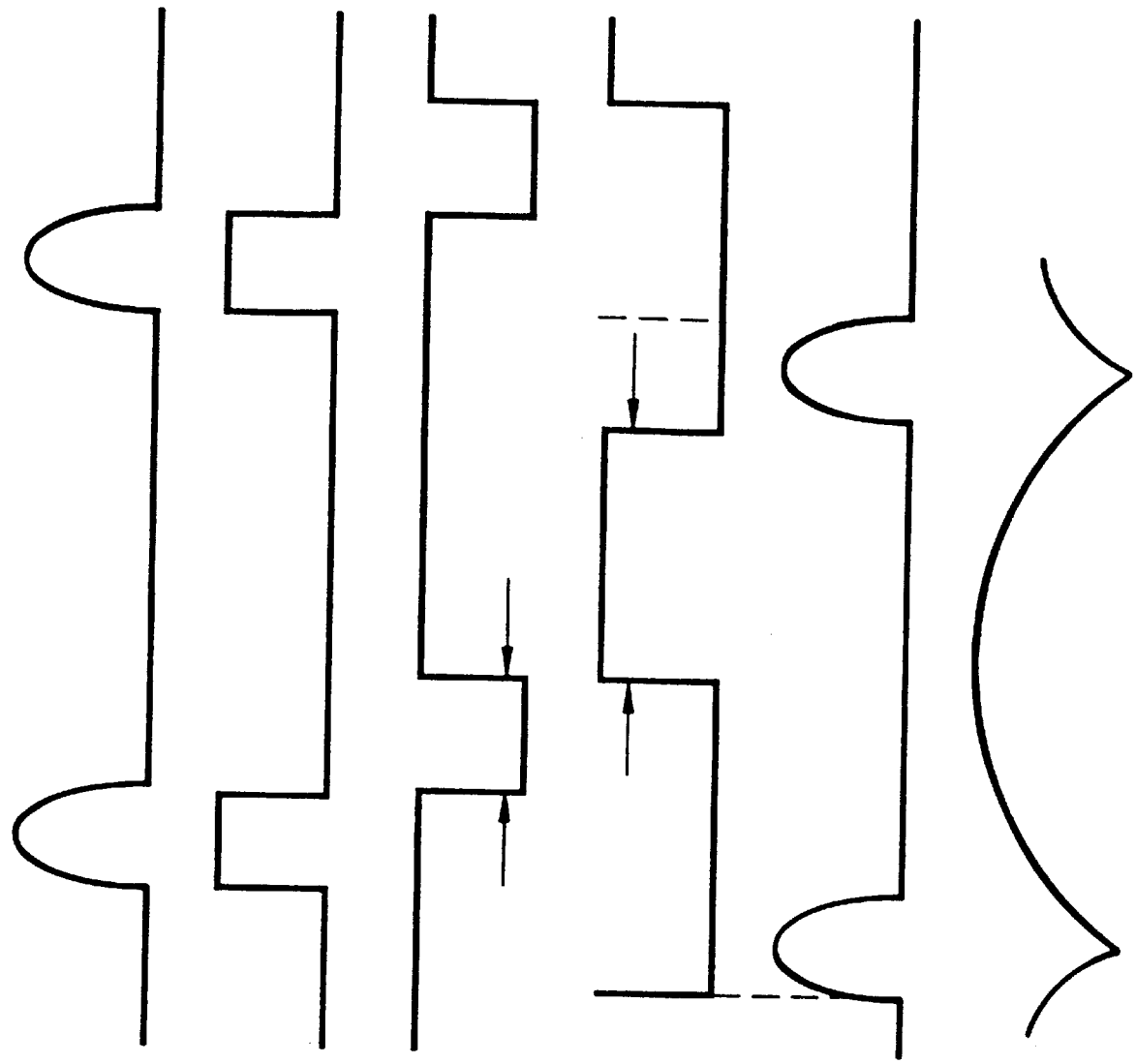

DELAY-COMPENSATING DYNAMIC FOCUS AMPLIFIER

BACKGROUND OF THE INVENTION

CLAIM OF PRIORITY

This application makes reference to, incorporates the same herein, and claims all benefits accruing under 35 U.S.C. §119 from an application entitled Delay-Compensating Dynamic Focus Amplifier earlier filed in the Korean Industrial Property Office on 24 Feb. 1996 and 3 Jan. 1997, and there duly assigned Ser. No. 96-4537 and 97-26 by that Office.

Field of the Invention

The present invention relates to a delay-compensating dynamic focus amplifier and, more particularly, to a delay compensating dynamic focus amplifier for delaying the output pulse with two one-shot multivibrators, varying the pulse width, and delay compensating a horizontal parabolic signal amplified according to the output signal of the one-shot multivibrators.

Discussion of Related Art

An unclear beam spot caused by an inadequate focusing electrode voltage is not a serious problem for general purpose television sets and low definition VDTs (Video Display Terminals).

However, such a focus error is very important for high definition video display terminals. In general, the distance between an electron gun and the landingpoint of the electron beam in a CRT (Cathode Ray Tube) varies on the top, bottom, left and right parts of the CRT. Therefore, an optimum focus can be attained through a dynamic focusing process by which the focusing electrode voltage varies depending on the landing points of the beam. The dynamic focusing process is much more important for a flat faced CRT screen now presently provided in display devices.

Static focusing is a process of applying a constant focusing electrode voltage to a third or fourth grid (G3 or G4) so as to form an electron lens for focusing.

Contrary to the static focusing, the dynamic focusing varies the focusing electrode voltage depending on the different horizontal and vertical distances from the electron beam to the electron beam spots on the screen of the CRT so as to be associated with the static focusing electrode voltage.

For an optimum focusing voltage, the waveform is parabolic in both horizontal and vertical directions. The dynamic focusing can be attained when an AC voltage is supplied to a focus electrode by forming and amplifying two waveforms of two deflection currents. In the process, the AC voltage supplied to the electrode is between 80V and 150V in a vertical direction, and between 200V and 800V in a horizontal direction. This means that the dynamic focusing circuit is basically a high voltage circuit.

With the delay of the horizontal parabolic dynamic voltage, the actually displayed signal is not in accord with the output focusing parabolic signal of the horizontal flyback, which results in the unbalance of the left and right foci.

To compensate for the delay of the horizontal parabolic dynamic voltage, the actual display signal and the parabolic dynamic voltage can be in accord with each other by delaying a horizontal flyback pulse H-FLB and a horizontal synchronizing signal H-SYNC.

In an earlier method of forming and amplifying the dynamic focus waveform, the dynamic focus waveform is amplified through a transformer by using a horizontal parabolic waveform generated in a horizontal S correction circuit and the amplified dynamic focus waveform is supplied to a focus pack.

In the above method, a horizontal synchronizing signal is supplied to the base of a horizontal output transistor via a resistance and an amplified horizontal synchronizing signal is generated at the collector of the horizontal output transistor.

This output signal turns a damper diode on or off and causes a sawtooth current to flow through a deflecting coil by means of the charging and discharging of two capacitors and which generates the horizontal parabolic waveform across the horizontal correction capacitor.

For a part of a cathode-ray tube, however, a higher horizontal focus voltage in the range of 450 to 550V is required instead of the existing horizontal focus voltage in the range of 330 to 350V for the purpose of promoting the accuracy of focusing. To satisfy this requirement, the horizontal dynamic focus voltage is obtained by using a transformer. But, the primary coil of the transformer must be provided with a sufficient current.

However, the current flowing through such an S correction circuit is not suitable to serve as a current source and provide a focus voltage needed in the cathode-ray tube. Besides, the horizontal frequency of a recent high-definition monitor is higher than 90 KHz. The amplified horizontal focus dynamic voltage is supplied to the focus pack of the flyback transformer. Then, the focus waveform will be delayed in the range of between 0.5 $\mu$s and 1.5 $\mu$s by the stray capacitance of the focus pack itself or the transformer.

Such a delay in the range between 0.5 $\mu$s and 1.5 $\mu$s does not seriously affect the cathode-ray tube and its focus performance for a relatively low horizontal frequency. But, it has a great effect on the horizontal synchronizing period as the horizontal frequency gets higher.

Moreover, such a display has a greater effect on the cathode-ray tube and its focus performance by the focus voltage difference in the left and right sides of the screen of the cathode-ray tube of about 200 to 300V when the focus voltage of the cathode-ray tube is as high as 500V.

A cascode amplifier is widely used for the purpose of amplifying the horizontal dynamic focus voltage. However, the use of the cascode amplifier also has a disadvantage in that the focus voltage is decreased when a sufficient current cannot be provided co the focus pack.

To solve this problem of the cascode amplifier, a complementary push-pull transistor pair is connected to the output terminal of the cascode amplifier so as to match impedances and provide sufficient current.

However, it is required to employ PNP and NPN transistors that have a sufficient voltage capability when the focus voltage of the cathode-ray tube is very high, and the voltage capability of the PNP transistor is below −600V. Therefore, this method of using the PNP and NPN transistors has the same disadvantages as the stray capacitance of the flyback transformer focus pack.

SUMMARY OF THE INVENTION

Accordingly, the present invention is directed to a delay-compensating dynamic focus amplifier that substantially obviates one or more of the problems due to limitations and disadvantages of the related art.

An object of the present invention is to provide a delay compensating dynamic focus amplifier for compensating for the delay of the focus waveform caused by a stray capacitance.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a delay-compensating dynamic focus amplifier includes a delay-compensating circuit comprising two one-shot multivibrators for receiving a horizontal flyback signal and for generating a sawtooth wave to compensate for a delay by adjusting a duty cycle, a focus waveform generator for receiving a delay-compensating output signal from the delay-compensating circuit and for generating a horizontal parabolic waveform, an amplifier for receiving the horizontal parabolic waveform from the focus waveform generator and for amplifying it depending on a regulated gain so as to provide a predetermined output current, and a controller for providing a control signal to the delay-compensating circuit and the waveform generator.

The waveform generator includes a push-pull amplifier for varying its output voltage by the control of the controlling section, and a field effect transistor for amplifying the output waveform received from the delay-compensating circuit.

It is to be understood that both the foregoing general description and the following detailed description are exemplary and explanatory and are intended to provide further explanation of the invention as claimed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 9A–9F are waveform diagrams of the signals generated by the respective sections in accordance with the present invention.

DETAILED DESCRIPTION OF PREFERRED EMBODIMENT

Figure 1:
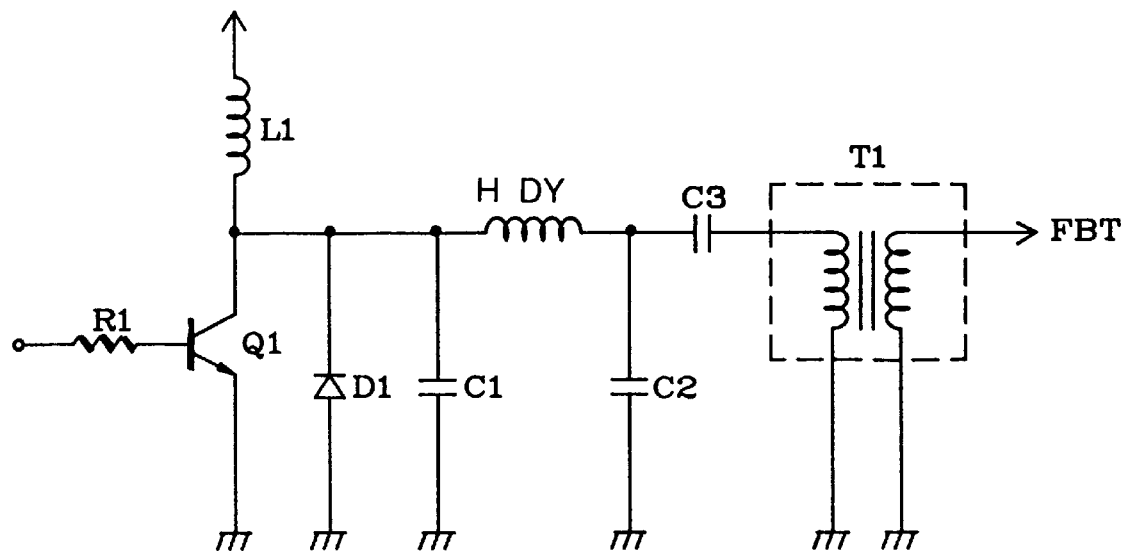
FIG. 1 is a circuit diagram of a horizontal output circuit.

As illustrated in FIG. 1, a horizontal synchronizing signal supplies to the base of a horizontal output transistor Q1 via resistance R1 and an amplifier horizontal synchronizing signal is generated at the collector of the horizontal output transistor Q1.

This output signal turns a damper diode D1 on and off and causes a sawtooth current flow through a deflecting coil H DY by means of the charging and discharging of the capacitors C1 and C2 which generate the horizontal parabolic waveform across the horizontal S correction capacitor C2.

The output across the capacitor C2 is fed to the primary of the transformer T1 via the capacitor C3.

Figure 2:
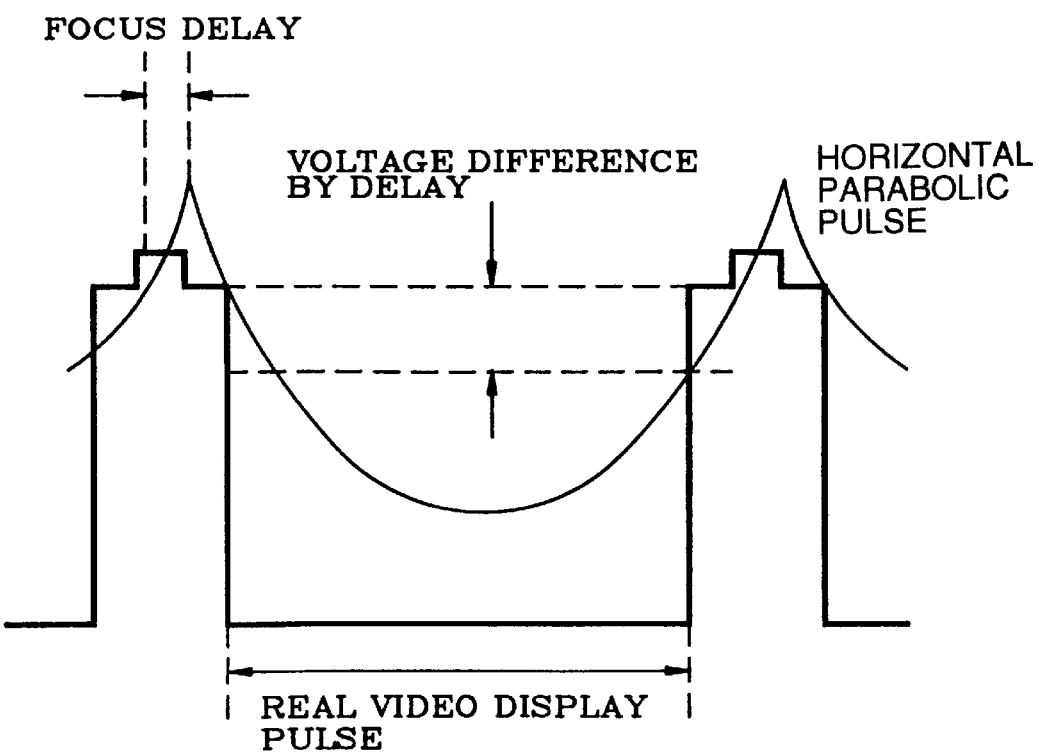
FIG. 2 is a waveform diagram showing the changes in the voltage of a cathode-ray tube caused by the delay of a horizontal parabolic signal.

FIG. 2 illustrates the problems cause by the delay of the circuit of FIG. 1.

Figure 3:
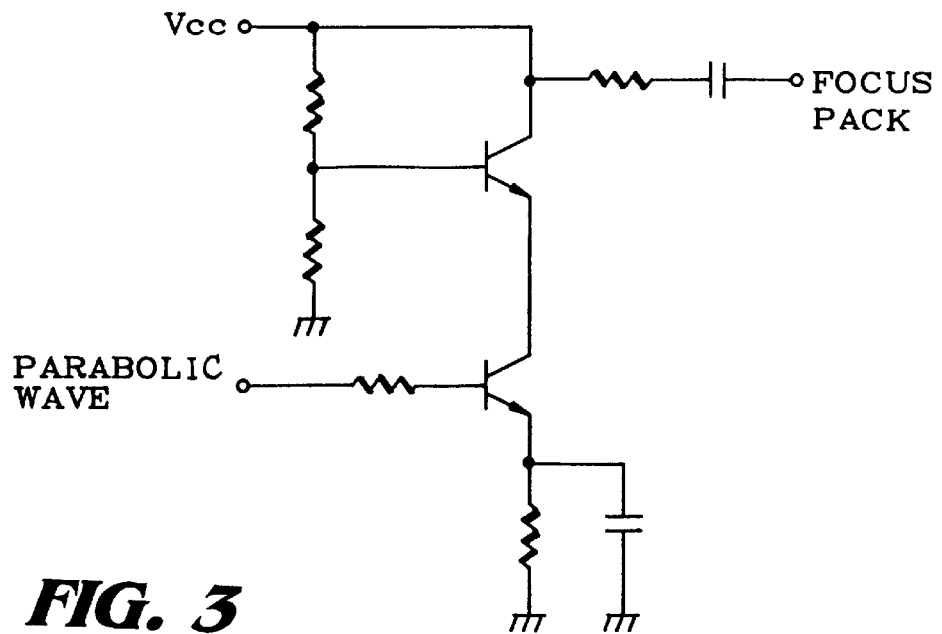
FIG. 3 is a circuit diagram of a dynamic focus amplifier having a cascode amplifier.

FIG. 3 illustrates a cascode amplifier which is widely used for the purpose of amplifying the horizontal dynamic focus voltage. However, the use of the cascode amplifier also has a disadvantage in that the focus voltages decreased when a sufficient current cannot be provided to the focus pack.

Figure 4:
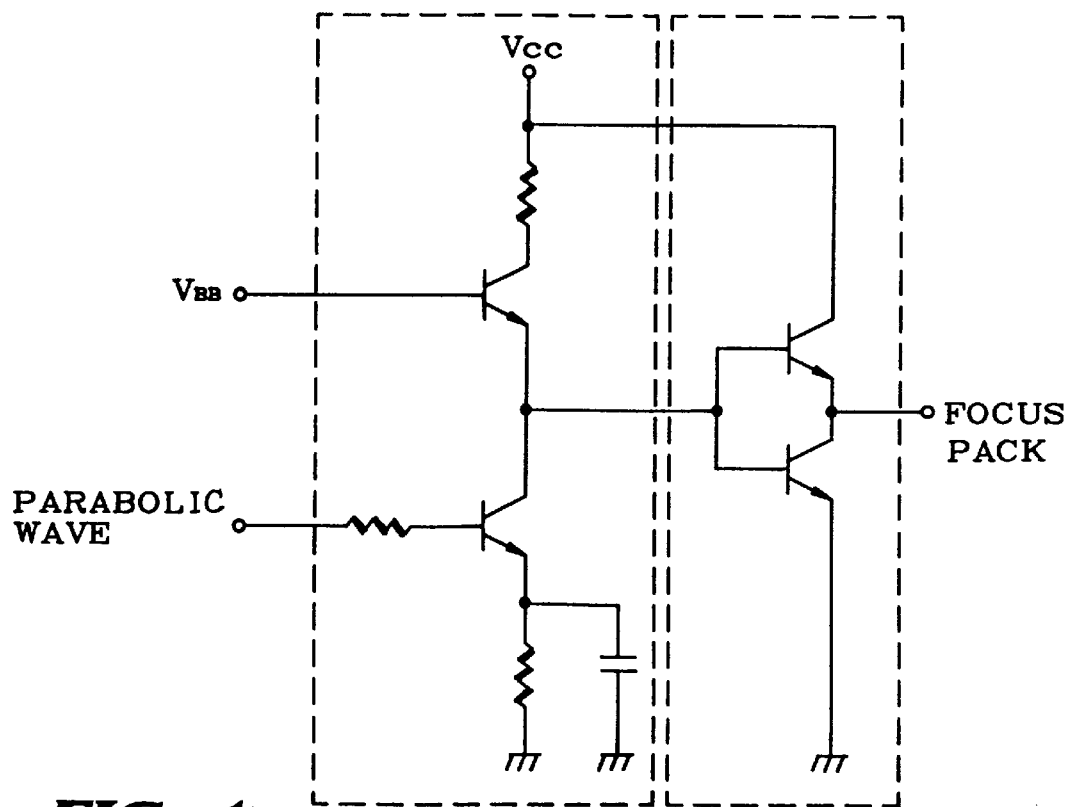
FIG. 4 is a circuit diagram of a dynamic focus amplifier further including a push-pull amplifier.

To solve this problem, a complimentary push-pull transistor pair is often connected to the output terminal of the cascode amplifier so as to match impedances and provide a sufficient output current as illustrated in FIG. 4.

Reference will now be made in detail to the preferred embodiments of the present invention, examples of which are illustrated in the accompanying drawings.

Figure 5:
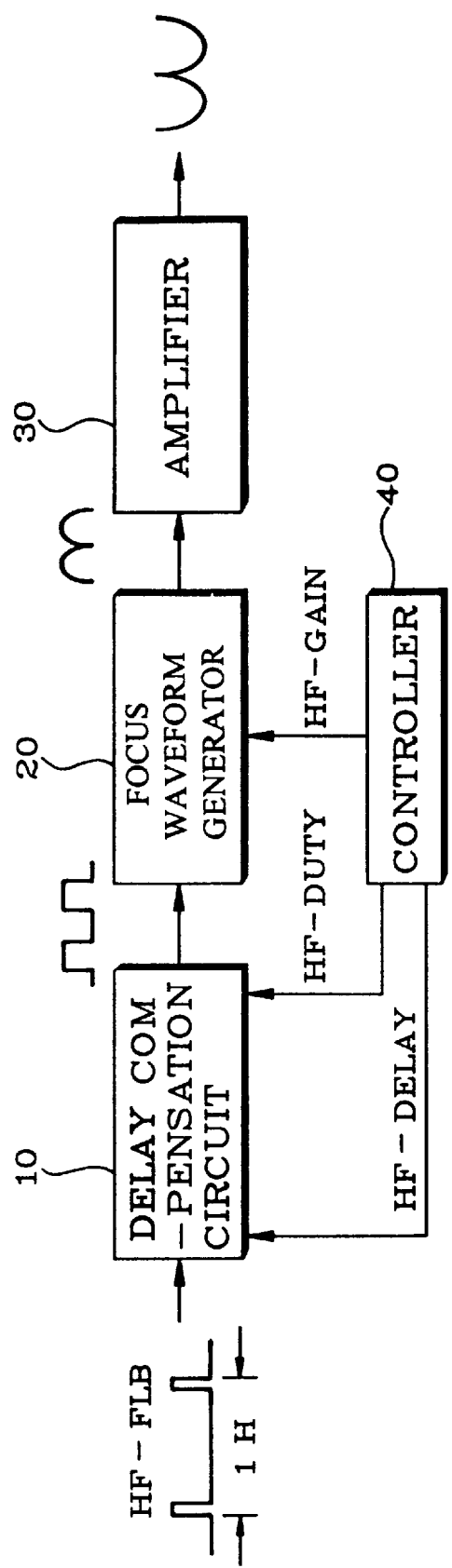
FIG. 5 is a block diagram of a focus delay dynamic focus circuit in accordance with the present invention.

FIG. 5 is a block diagram of a focus delay dynamic focus circuit in accordance with the present invention.

The delay-compensating dynamic amplifier comprises a delay-compensation circuit 10, a focus waveform generator 20, an amplifier 30 and a controller 40.

The delay-compensation circuit 10 receives a horizontal flyback pulse and generates a signal having a duty width that is adequately compensated according to a delay regulating signal HF-DELAY and a duty regulating signal HF-DUTY generated by the controller 40.

The focus waveform generator 20 receives the output signal of the delay-compensation circuit 10 and produces a parabolic waveform.

The amplifier 30 generates a parabolic signal amplified according to a gain regulating value HF-GAIN that is provided by the controller 40 via the waveform generator 20.

Figure 6:
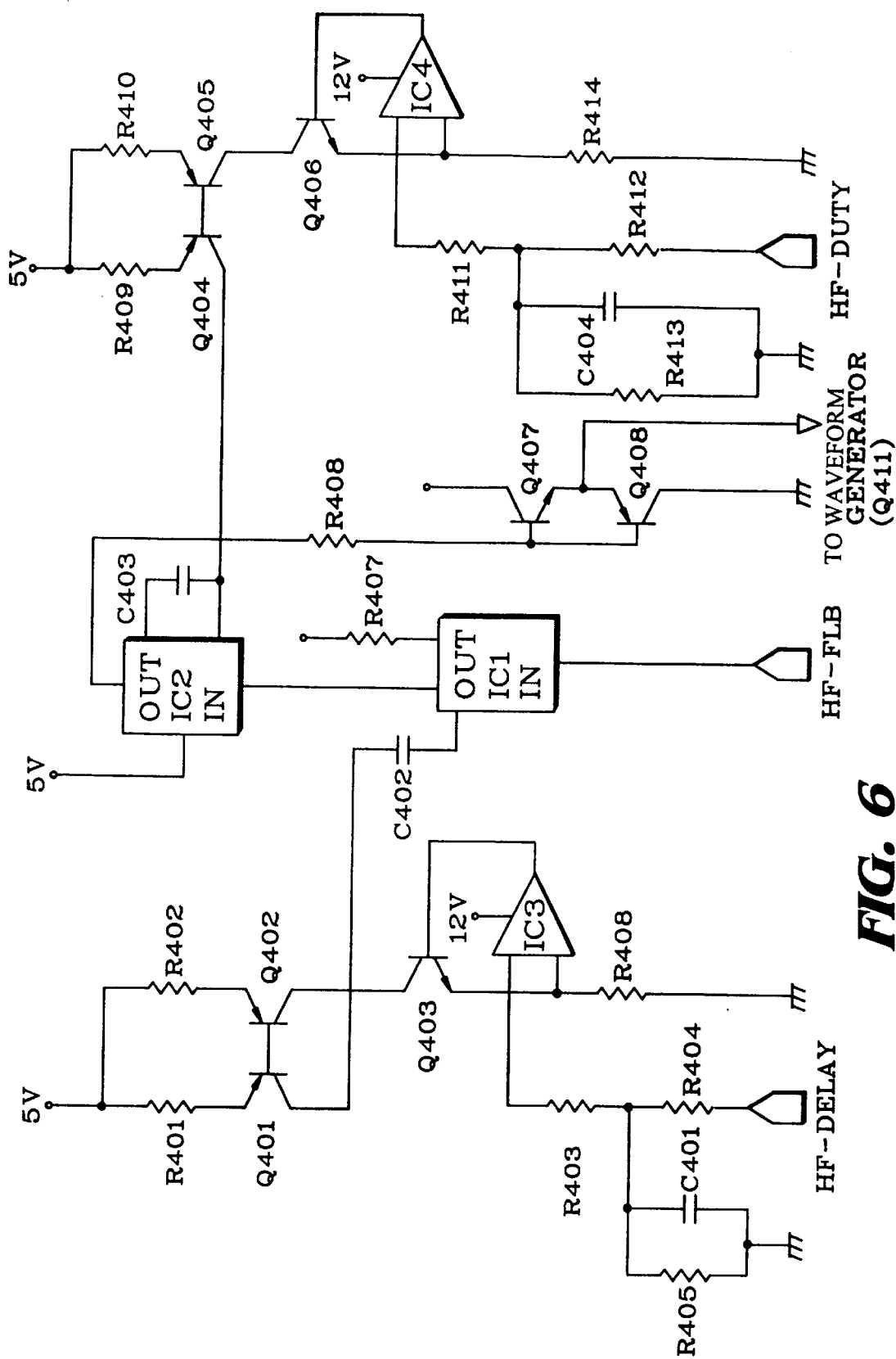
FIG. 6 is a circuit diagram of a delay compensating circuit section in accordance with the present invention.

To describe the respective sections in more detail, as shown in FIG. 6, the delay-compensation circuit 10 includes first and second differential amplifiers comprising two one shot multivibrators IC1 and IC2, transistors Q401 through Q406, and operational amplifiers IC3 and IC4.

A horizontal flyback signal H-FLB (a waveform converted from a horizontal deflection signal) is input to the one-shot multivibrator IC1 and makes the one-shot multivibrator IC1 unstable according to a delay signal of the controller transmitted to the first differential amplifier so as to generate an output pulse at the output terminal thereof.

The width of the output pulse compensates for the delay by a control signal HF-DELAY of the controller 40 input to the capacitor C402 and the differential amplifiers (transistors Q401, Q402 and Q403, and the operational amplifier IC3). The control signal HF-DELAY is the signal in the range of 0V to 12V that is generated by the controller 40.

The pulse signal of the output signal of the first one shot multivibrator IC1 is input to the one input terminal of the second one-shot multivibrator IC2. Another input terminal of the second one-shot multivibrator IC2 is connected to the second differential amplifier which receives the duty cycle regulating signal HF-DUTY of the controller 40.

The pulse width varies by means of the differential amplifier comprising the transistors Q404, Q405 and Q406 and the operational amplifier IC4, and the capacitor C403.

Figure 7:
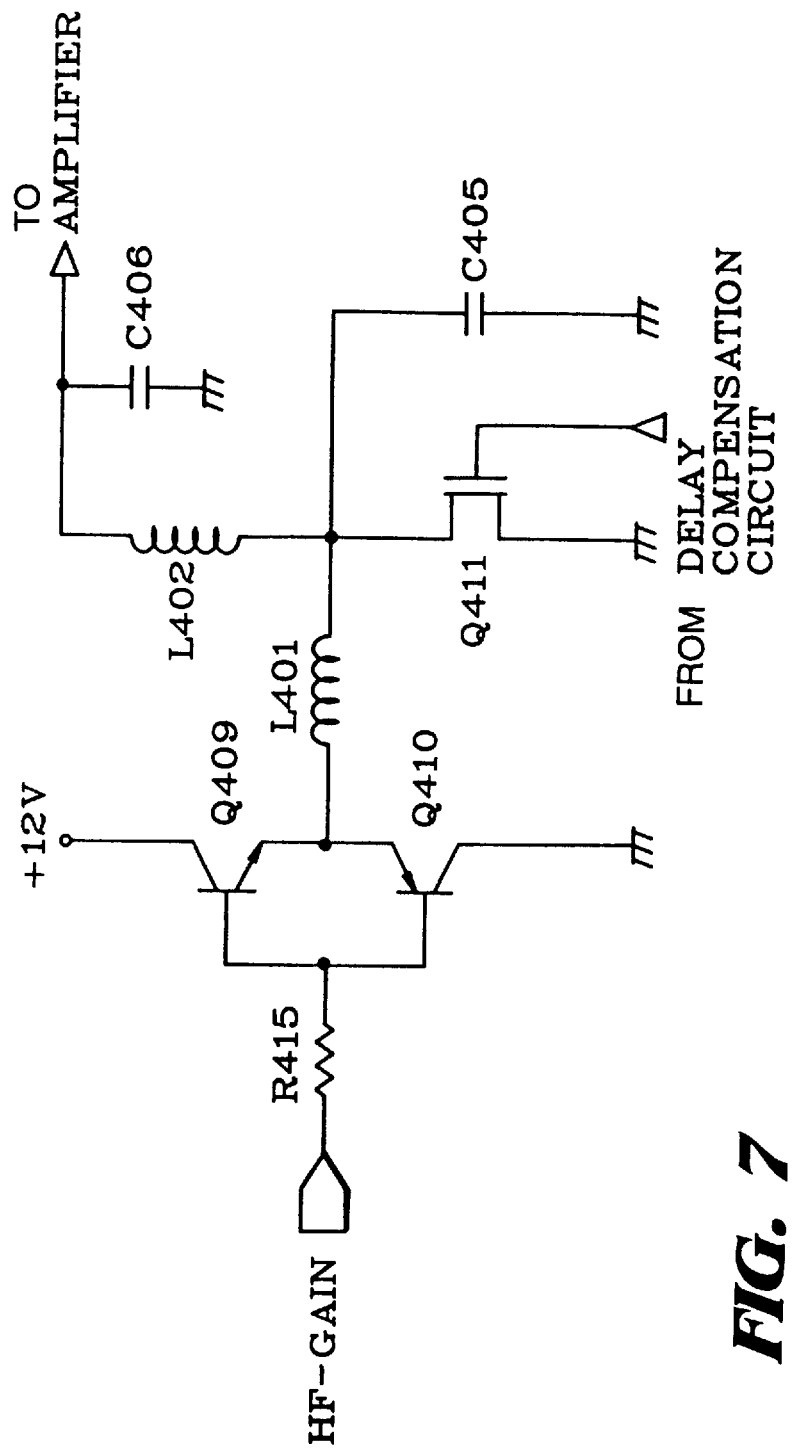
FIG. 7 is a circuit diagram of a waveform generator in accordance with the present invention.

The output terminal of the second one-shot multivibrator IC2 generates a pulse having a proper duty cycle to drive the field effect transistor Q411 of the focus waveform generator 20 of FIG. 7.

The pulse generated by the second one-shot multivibrator IC2 is input to the focus waveform generator 20 through the buffer transistors Q407 and Q408.

FIG. 7 shows a circuit diagram of the waveform generator 20.

The signal having a regulated duty cycle of the delay-compensation 10 is input to the gate of the field effect transistor Q411. The focus waveform generator 20 receives the output signal of the delay-compensation circuit 10 and outputs a horizontal parabolic waveform to the amplifier 30 by the gain control signal HF-GAIN of the controller 40.

Figure 8:
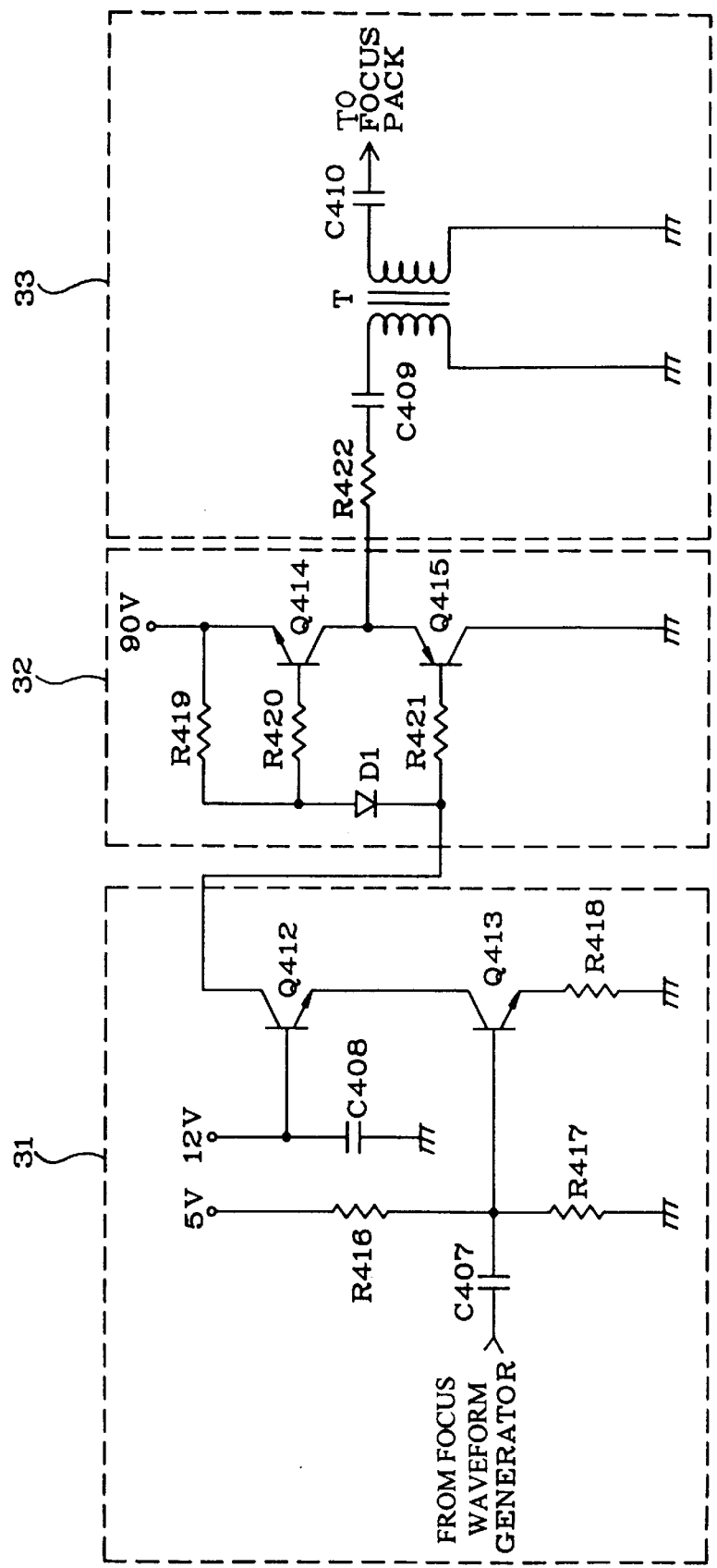
FIG. 8 is a circuit diagram of an amplifying section in accordance with the present invention.

As shown in FIG. 8, the amplifier 30 comprises a first amplifying section 31 using a cascode transistor pair to increment an amplification ratio by a sufficient current supply, an impedance matching section 32 using a complementary push-pull transistor pair, and a second amplifying section 33 using a transformer T.

The parabolic waveform generated by the focus waveform generator 20 is amplified by the cascode amplifier 31 comprising transistors Q412 and Q413. The output signal of the cascode amplifier 31 is input to the complementary push-pull transistor circuit 32 via a resistance R421. Then, it is amplified by the primary side of the transformer as a horizontal focus signal and input to the focus pack of the flyback transformer T.

FIGS. 9A–9F are a waveform diagrams of the signals generated by the respective sections.

First, the flyback pulse of FIG. 9A generated through a horizontal deflection yoke H-DY is converted into the waveform of FIG. 9B and is supplied to the first one-shot multivibrator IC1 of the delay-compensation circuit 10.

A horizontal synchronizing signal H-SYNC may be used instead of the horizontal flyback signal H-FLB, but this can disadvantageously change the focus according to the variable horizontal position.

In addition, the delay control signal HF-DELAY of the controller 40 is provided to the other input terminal of the one-shot multivibrator IC1 through the first differential amplifier.

The output terminal of the first one-shot multivibrator IC1 generates a waveform for compensating for the delay, as shown in FIG. 9C. This output signal is sent to one input terminal of the second one-shot multivibrator IC2. The duty cycle regulating signal HF-DUTY of the controller 40 is input to another input terminal of the second one-shot multivibrator IC2.

Then, the output terminal of the second one-shot multivibrator IC2 generates a waveform as shown in FIG. 9D on the basis of the output, waveform shown in FIG. 9C. The waveform of FIG. 9D has an proper duty cycle to drive the field effect transistor FET Q411 of the waveform generator 20 connected to an output of the second one-shot multivibrator IC2.

FIG. 9E shows the output signal of the transistor Q411 which is driven by the output signal of the second one-shot multivibrator IC2 of the delay-compensation circuit 10 as shown in FIG. 9D.

The gain of the output can be regulated by DC regulating the S- terminal of the transistor Q411. Therefore, the signal supplied to the amplifier 30 and output across the capacitor C406 is a parabolic waveform as shown in FIG. 9F.

It will be apparent to those skilled in the art that various modifications and variations can be made in a delay compensating dynamic focus amplifier of the present invention without departing from the spirit or scope of the invention. Thus, it is intended that the present invention covers the modifications and variations of this invention provided they come within the scope of the appended claims and their equivalents.

What is claimed is:

1. A delay-compensating dynamic focus amplifier, comprising:

a delay-compensation circuit comprising first and second multivibrators for receiving a horizontal flyback signal and for generating a sawtooth wave to compensate for a delay by adjusting a duty cycle;

a focus waveform generator for receiving a delay compensation output signal from the delay-compensation circuit and for generating a horizontal parabolic waveform;

an amplifier for receiving the horizontal parabolic waveform from the focus waveform generator and for amplifying it depending on a regulated gain so as to provide a predetermined output current; and a controller for providing a control signal to the delay compensation circuit and the focus waveform generator.

2. The delay-compensating dynamic focus amplifier as defined in claim 1, wherein the focus waveform generator comprises:

a push-pull output stage for varying its output voltage under the control of the controller; and a field effect transistor for amplifying the output waveform received from the delay-compensation circuit.

* * * * *